United States Patent
Aufderheide

(10) Patent No.: US 11,299,185 B2
(45) Date of Patent: Apr. 12, 2022

(54) MONITORING INFRASTRUCTURE FACILITIES BY MEANS OF GEO-CLUSTERING

(71) Applicant: SIEMENS MOBILITY GMBH, Munich (DE)

(72) Inventor: Helge Aufderheide, Munich (DE)

(73) Assignee: Siemens Mobility GmbH, Munich (DE)

( * ) Notice: Subject to any disclaimer, the term of this patent is extended or adjusted under 35 U.S.C. 154(b) by 80 days.

(21) Appl. No.: 16/334,444

(22) PCT Filed: Sep. 6, 2017

(86) PCT No.: PCT/EP2017/072292
§ 371 (c)(1),
(2) Date: Mar. 19, 2019

(87) PCT Pub. No.: WO2018/050502
PCT Pub. Date: Mar. 22, 2018

(65) Prior Publication Data
US 2019/0210623 A1   Jul. 11, 2019

(30) Foreign Application Priority Data

Sep. 19, 2016   (DE) .................... 10 2016 217 883.0

(51) Int. Cl.
*B61L 27/00* (2006.01)
*G06F 16/9537* (2019.01)
*G06F 16/29* (2019.01)

(52) U.S. Cl.
CPC ....... *B61L 27/0094* (2013.01); *B61L 27/0077* (2013.01); *B61L 27/0088* (2013.01); *G06F 16/29* (2019.01); *G06F 16/9537* (2019.01)

(58) Field of Classification Search
CPC ............ B61L 27/0077; B61L 27/0088; B61L 27/0094; G06F 16/29; G06F 16/9537
See application file for complete search history.

(56) References Cited

U.S. PATENT DOCUMENTS

| 9,296,401 B1* | 3/2016 | Palmer | B61L 25/026 |
| 2008/0177678 A1* | 7/2008 | Di Martini | G06Q 30/02 |
| | | | 705/412 |

(Continued)

FOREIGN PATENT DOCUMENTS

| EP | 1900597 A1 | 3/2008 |
| EP | 2375302 A2 | 10/2011 |

(Continued)

*Primary Examiner* — Hunter B Lonsberry
*Assistant Examiner* — Daniel L Greene
(74) *Attorney, Agent, or Firm* — Laurence A. Greenberg; Werner H. Stemer; Ralph E. Locher

(57) ABSTRACT

A method and a computer program product monitor infrastructure facilities of a route network for vehicles. The vehicles generate messages about a respective operating state, which messages are transmitted with a time and a specification of location which represent the occurrence of a signaled operating state, to a land-based evaluation device. The messages received are stored in a database and evaluated. The messages of a predefined time period relating to a predefined operating state are read out from the database. Limited areas with frequent occurrence of the predefined operating state are determined by means of a predefined algorithm. The infrastructure facilities in the areas with the frequent occurrence of the predefined operating state as a possible cause of the predefined operating state of the vehicles are identified, and information about the infrastructure facilities which are detected as a possible cause of the predefined operating state of the vehicles are output.

11 Claims, 1 Drawing Sheet

(56) References Cited

U.S. PATENT DOCUMENTS

| | | | |
|---|---|---|---|
| 2008/0236275 A1* | 10/2008 | Breed | B60N 2/2806 |
| | | | 73/290 V |
| 2008/0262646 A1* | 10/2008 | Breed | G07C 5/0808 |
| | | | 700/226 |
| 2008/0270076 A1* | 10/2008 | Breed | B60R 21/01538 |
| | | | 702/185 |
| 2010/0004804 A1 | 1/2010 | Anderson et al. | |
| 2010/0142447 A1* | 6/2010 | Schlicht | H04W 24/02 |
| | | | 370/328 |
| 2010/0204857 A1 | 8/2010 | Forrest et al. | |
| 2015/0308927 A1* | 10/2015 | Kono | B61L 23/042 |
| | | | 702/182 |
| 2018/0284758 A1* | 10/2018 | Cella | H04L 67/12 |
| 2019/0171187 A1* | 6/2019 | Cella | G05B 23/0221 |

FOREIGN PATENT DOCUMENTS

| | | |
|---|---|---|
| EP | 3042823 A1 | 7/2016 |
| WO | 2016112358 A1 | 7/2016 |

\* cited by examiner

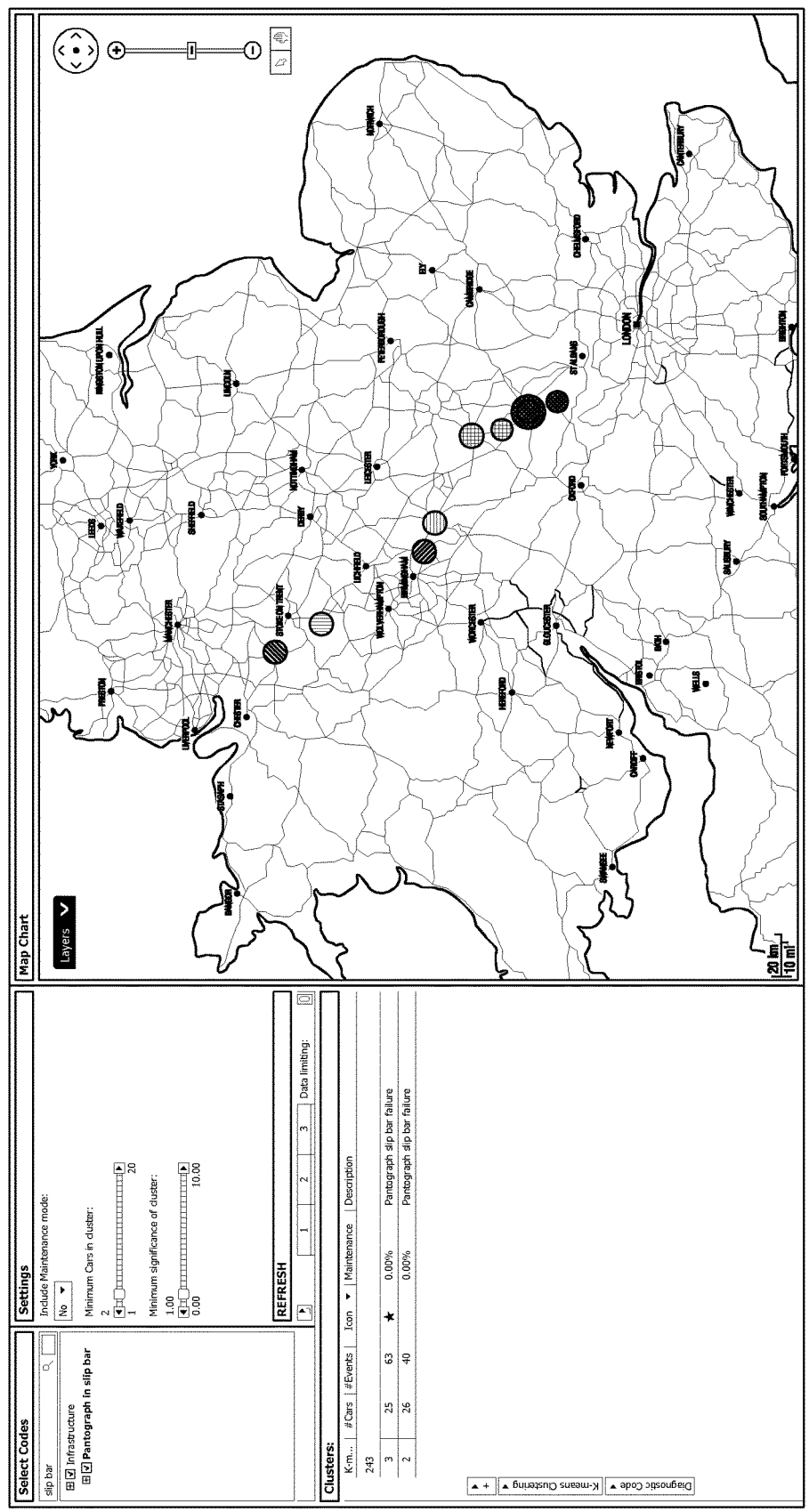

MONITORING INFRASTRUCTURE FACILITIES BY MEANS OF GEO-CLUSTERING

BACKGROUND OF THE INVENTION

Field of the Invention

The invention relates to a method and a computer program product for executing said method for monitoring infrastructure facilities of a route network for vehicles, which vehicles generate messages about their respective operating state, which messages are transmitted with an associated time and location specification that represent the occurrence of the signaled operating state to a land-based evaluation device, which messages are received by the land-based evaluation device, stored in a database and evaluated.

Incidents or faults of a technical nature in the operation of vehicles, for example rail vehicles, can have a variety of causes. For example, an unintentional lowering of a pantograph ("dropping") can be attributed to too low a contact force, which represents a malfunction of the rail vehicle itself, or can be caused by events external to the vehicle, for example due to an incorrect transition point between two interconnected individual cables of the overhead line. Also, the causes for excessive sparking or spinning of driven wheels can be found both in the vehicle itself and in infrastructure facilities.

A prerequisite for minimizing these technical incidents thus involves knowledge of the causes of the technical incidents, without which the faults cannot be rectified. If the accidental lowering of a pantograph is due to the vehicle itself, the vehicle would need to be checked. Correspondingly, in the other case the overhead line would need to be checked at the appropriate position.

Without detailed knowledge of the causes, both the vehicle as well as the route network would need to be checked.

Both of these are currently performed by visual inspections, which leads to the vehicle being taken out of service for the time required to test and possibly repair it, and to closure of the appropriate section of the route network for the time required for testing and, where necessary, repair.

SUMMARY OF THE INVENTION

The object of the invention is to increase the technical availability of vehicles and the route network and at the same time, to significantly reduce their operating costs.

This object is achieved by the subject matter of the independent claim. Extensions and embodiments of the invention can be found in the features of the dependent claims.

A method according to the invention for monitoring infrastructure facilities of a route network for vehicles, which vehicles generate messages about their respective operating state, which messages are transmitted with an associated time and location specification that represent the occurrence of the signaled operating state to a land-based evaluation device, and which are received by the land-based evaluation device, stored in a database and evaluated, comprises the following method steps:

reading out the messages of a predefined time period relating to at least one predefined operating state from the database;

determining limited areas with frequent occurrence of the predefined operating state by means of a predefined algorithm;

identifying the infrastructure facilities in the areas having the frequent occurrence of the predefined operating state as a possible cause of the predefined operating state of the vehicles, and outputting information about the infrastructure facilities that are identified as a possible cause of the predefined operating state of the vehicles.

The method according to the invention is advantageously a computer-implemented method, and therefore exists in the form of software and can be easily stored on a storage medium, transported and loaded therefrom back into a processing unit. This is referred to as a computer program product (data carrier with code), which, if loaded into a computer, causes the method according to the invention to be executed. The evaluation device therefore comprises both means for reading the storage medium with the computer-implemented methods that are stored on and can be read from said medium, as well as a processing unit which is suitably designed for executing the computer-implemented method.

In addition to the identification of limited areas with frequent occurrence, this also allows areas with isolated occurrences of the predefined operating state to be determined. An extension of the invention thus consists of identifying the vehicles in, in particular limited, areas with isolated occurrence of the predefined operating state as a possible cause of the predefined operating state of the vehicles and outputting information about the infrastructure facilities that are identified as a possible cause of the predefined operating state of the vehicles.

The areas of isolated occurrence of the predefined operating state are different to the areas of frequent occurrence and are therefore located outside of these. The following considerations, in particular relating to determining the causes or to outputting the causes, to the limited areas of frequent occurrence of the predefined operating state are also intended to apply to the areas of occasional occurrence of the predefined operating state.

The vehicles are in particular rail vehicles. The route network is then a route network for rail vehicles. It comprises infrastructure facilities such as tracks with rails and sets of points, signaling systems or contact lines, mostly implemented as overhead cables or busbars. In accordance with an extension of the method according to the invention, this is therefore used for monitoring infrastructure facilities of a route network for rail vehicles.

The messages are generated on the vehicles and transmitted to at least one land-based evaluation device, for example by wireless means. To this end, each vehicle has at least one transmitting device and the at least one land-based evaluation device has at least one receiving device. The messages comprise data relating to a current operating state in a predefined form, so that they can be evaluated by the land-based evaluation device. The land-based evaluation device, as indicated above, is therefore suitably designed. In addition, the messages comprise at least the time and location of the occurrence of the reported operating state in a predefined form, for example, the location is specified using GPS coordinates or by means of other satellite navigation data, such as GPS, GLONASS, Galileo, BEIDOU etc.

First of all, the messages stored in the database relating to one or more predefined operating states, which were generated within a specified period of time, are read out. It is also possible for all messages from the time interval to be read out and then further processed after being grouped according to the predefined operating states or sorted according to the individual operating states.

In order to determine limited areas with frequent occurrence of the predefined operating state and so ultimately to identify the infrastructure facilities located at the locations or in the areas of the frequent occurrence of the predefined operating states as a possible cause of the predefined operating state of the vehicles, a predefined algorithm is used.

On the one hand, the limited areas can be delimited from each other and therefore do not overlap each other. On the other hand, their respective size and thus their planar extension can be narrowly defined—in that case, compared to the total area of an entire area under consideration, which includes all infrastructure facilities to be monitored and in which all messages to be evaluated relating to the predefined operating state have occurred, they are relatively small. The limited areas can also be chosen to be the same size.

In an extension, the limited areas with frequent occurrence of the predefined operating state are determined by means of a predefined algorithm, in particular an automatic segmentation algorithm, by grouping the location specifications. A limited area with multiple occurrence of the at least one predefined operating state can also be referred to as a cluster. Therefore, the terms clustering or geo-clustering are also appropriate here.

A number of different suitable algorithms have become known, in particular, so-called cluster analyses, in particular from the field of machine learning ("machine learning clustering methods"). Automatic segmentation algorithms from the field of unsupervised learning are used to discover patterns or similarity structures in (large) datasets, which differ from the unstructured noise.

In accordance with another extension the limited areas with frequent occurrence of the predefined operating state are determined by means of a k-means algorithm.

In the application of the k-means algorithm a number of possible limited areas are defined within an overall area. In an extended form, this number of possible limited areas within the overall area is defined as a function of the size or the planar extension of the overall area and as a function of the predefined operating state. In a further extension, a very large number of possible limited areas is defined within the overall area, so that sporadic individual cases can each be assigned to their own limited area, so that these are subsequently filtered out as "noise" rather than being assigned to the nearest area. In this way, for example, on a total area of 100,000 $km^2$, 10,000 possible areas can be defined, so that each limited area covers only 10 $km^2$. Depending on the number of the infrastructure facilities to be monitored, such as the number of sets of points, in the overall area or even according to their cumulative arrangement in the overall area, for example in the area of stations or depots, the limited areas can be chosen to be smaller or larger.

As an alternative to the k-means algorithm a DBSCAN algorithm can be used to identify locations with frequent occurrence of the predefined operating state. DBSCAN stands for Density-Based Spatial Clustering of Applications with Noise ([German translation]). This algorithm operates mainly with a predefined parameter, namely the maximum distance between the locations of the occurrence of the predefined operating states in the same limited area. In order to determine the limited areas with frequent occurrence of the predefined operating state by means of the DBSCAN algorithm, the method is extended such that a maximum distance between the locations of the occurrence of the predefined operating states in the same limited area is specified as a function of the predefined operating state. Here, too, depending on the infrastructure facility to be monitored—and thus as a function of the predefined operating state of the vehicle—the maximum distance can be selected. Thus, for example for monitoring overhead lines or points, a maximum distance of 100 m can be specified. In addition to the maximum distance, in the determination of the limited areas using the DBSCAN algorithm a further parameter can be specified, namely the minimum number of "neighbors" to be reached. This parameter is used to define when an isolated occurrence of the predefined operating state exists and it is typically set to $z>1$, for example, to $z=3$.

Other algorithms are possible and typically come from, for example, the group known as Gaussian Mixture Models (GMM).

A further development of the invention involves the idea that to determine the limited areas with frequent occurrence of the predefined operating state by means of the predefined algorithm, messages relating to the predefined operating state of vehicles on identical journeys are exclusively taken into account. This can be carried out in practice as a filtering operation following the above-described segmentation using the k-means or DBSCAN algorithm. As already described above, in order to reduce the number of the limited areas to be filtered, depending on the occurrence of the predefined operating state, in the case of the DBSCAN algorithm the minimum number of neighbors to be reached can be increased.

Thus, two messages from one and the same vehicle in a limited area are only taken into account once, unless there is a very long time, typically several hours or a day, specified between them. The vehicle must have either moved in the meantime, or it must have been de-equipped and re-equipped. In the case of a two-directional vehicle, the reversal of the direction of travel of the vehicle could also have the same effect. In an extension, to determine limited areas with frequent occurrence of the predefined operating state by means of the predefined algorithm, messages relating to the predefined operating state of non-identical vehicles are exclusively taken into account. The non-identical vehicles are not necessarily differently equipped. Vehicles of the same type can be designed to be completely identical in all technically relevant features. However, this must not involve the same vehicle which has generated and transmitted two messages relating to the predefined operating state at the same place, or in the same limited area, at two different times within the period under consideration.

The specification of the above-mentioned parameters, for example, the specification of a number of possible limited areas within an overall area of the messages relating to the predefined operating state or the maximum distance between the locations of the occurrence of the predefined operating states in the same limited area, can be carried out by the user. In an extension, all parameters for determining the limited areas with frequent occurrence of the predefined operating state using the predefined algorithm can be specified by a user.

Additionally or alternatively, the output of information can be controlled by a user. The user can specify, for example, threshold values that must be exceeded or undershot, so that information can be output to the user. Threshold values can relate to the number x of messages relating to the predefined operating state of vehicles on non-identical journeys and/or a number y of messages relating to the predefined operating state in a limited area with frequent occurrence of the predefined operating state. If, for example, in a first limited area with frequent occurrence of the predefined operating state three messages exist relating to the predefined operating state of vehicles on non-identical journeys and in a second limited area there are five, and if the corresponding threshold is then set to at least four, only the second area, or the infrastructure facilities located in the second area, are output as a possible cause of the predefined operating state of the vehicles.

Thus, for example, the determination of the limited areas with frequent occurrence of the predefined operating state using the specified algorithm, or at least the output of information about the infrastructure facilities identified as a possible cause of the predefined operating state of the vehicles, can in future be carried out as a function of a specified relative frequency of the messages relating to the at least one predefined operating state in the predefined possible limited areas with frequent occurrence of the predefined operating state relative to a total number of messages relating to the at least one specified operating condition that are read out of the database and processed using the predefined algorithm. Thus, it is possible to only output clusters with a high relative number, such as 1-10% of the total number of messages relating to the at least one predefined operating state.

Both the evaluation unit and the computer program product must of course be suitably designed.

The information about the limited areas with the infrastructure facilities identified as a possible cause of the predefined operating state of the vehicles, or directly about the infrastructure facilities thus identified, can, in turn, be output in the form of messages, for example via a screen in the evaluation device.

In addition to the information output about the limited areas with the infrastructure facilities identified as a possible cause of the predefined operating state of the vehicles or about the infrastructure facilities identified as a possible cause of the predefined operating state of the vehicles, information can be output relating to a total number of messages read out of the database and processed by means of the predefined algorithm, relating to the at least one predefined operating state and/or to a respective absolute number of messages relating to the at least one predefined operating state in the areas with frequent occurrence of the predefined operating state and/or relating to a respective relative frequency of the messages relating to the at least one predefined operating state in the areas with frequent occurrence of the predefined operating state relative to the total number of messages read out of the database and processed by means of the predefined algorithm, relating to the at least one predefined operating state, and/or relating to a respective number of messages relating to the at least one predefined operating state of non-identical vehicles and/or of vehicles on non-identical journeys in the areas with frequent occurrence of the predefined operating state, and/or relating to a respective number of messages relating to the at least one predefined operating state of non-identical vehicles or of vehicles on non-identical journeys in the areas with frequent occurrence of the predefined operating state, and/or relating to a respective relative frequency of messages relating to the at least one predefined operating state of non-identical vehicles or of vehicles on non-identical journeys in the areas with frequent occurrence of the predefined operating state relative to the total number of messages read out of the database and processed by means of the predefined algorithm relating to the at least one predefined operating state and/or relating to a respective planar extension of the limited areas with frequent occurrence of the predefined operating state and/or to a number of possible limited areas within an entire area of the messages relating to the predefined operating state and/or to the algorithm for determining the limited areas with frequent occurrence of the predefined operating state and/or to the specified parameters of the algorithm for determining the limited areas with frequent occurrence of the predefined operating state and/or to the predefined operating state.

In particular, the individual limited areas with frequent occurrence of the predefined operating state can be classified into ranked lists according to different criteria, for example, according to the respective absolute number of messages relating to the at least one predefined operating state in the areas with frequent occurrence of the predefined operating state and/or according to the respective relative frequency of the messages relating to the at least one predefined operating state in the areas with frequent occurrence of the predefined operating state relative to the total number of messages relating to the at least one predefined operating state that are read out of the database and processed using the predefined algorithm, and/or according to the respective number of messages relating to the at one predefined operating state of non-identical vehicles and or of vehicles on non-identical journeys in the areas with frequent occurrence of the predefined operating state.

In an extension, a ranked list of the areas with frequent occurrence of the predefined operating state is created and is output as a function of a respective number of the messages relating to the at least one predefined operating state, in particular from non-identical vehicles or from vehicles on non-identical journeys, in the areas with frequent occurrence of the predefined operating state, and/or of a respective planar extension of the limited areas with frequent occurrence of the predefined operating state.

Thus, the significance of the limited areas with frequent occurrence of the predefined operating state is determined by means of a predefined algorithm and output in a ranked list, for example, displayed on a screen. The limited areas can be displayed on a map, for example in the form of circles. The colors of the circles can reflect the predefined operating state. The sizes of the circles, in turn, can be used in a similar way to sketch the relative frequency of messages relating to the predefined operating state in the limited area.

A further advantageous development of the invention is that further messages relating to the at least one predefined operating state, which are associated with a time that represents the occurrence of the signaled operating state, which occurs after the specified period of time, are processed with the predefined algorithm without reading out of the database and processing the messages from the specified time period relating to at least one predefined operating state once again.

To this end, at least one additional message relating to the at least one predefined operating state is read out of the database after the specified period, and using the predefined algorithm it is determined whether the at least one additional message must be assigned to a limited area with frequent occurrence of the predefined operating state.

Then—if the at least one additional message must be assigned to a limited area with frequent occurrence of the predefined operating state—the limited areas of the frequent occurrence of the predefined operating state, or the infrastructure facilities located in the limited areas, are again identified as a possible cause of the predefined operating state of the vehicles, and information about the limited areas of the frequent occurrence of the predefined operating state or about the infrastructure facilities identified as a possible cause of the predefined operating state of the vehicles are output. Otherwise, this would be an isolated occurrence and the vehicle would be output as the cause.

According to the algorithm used, the processing of the messages after the specified time period and thus the determination of the limited areas with frequent occurrence of the predefined operating state proceed in different ways.

Thus, for example, it can be determined whether the message was generated at a location which is in a limited area with frequent occurrence of the predefined operating state, to which limited area thus at least two or more messages from the specified period were assigned. If only a single message from the specified time period was assigned to the limited area, then this previously involved an isolated occurrence. Depending on the criterion, the limited area following the assignment of the additional message relating to this limited area can be identified and output as a limited area with frequent occurrence of the predefined operating state. An alternative consists in the fact that the distances of the location of the additional message to the nearest locations of the messages from the specified time period are calculated and it is then determined whether these should be assigned to an existing cluster, whether a new cluster is detected or whether an isolated occurrence of the predefined operating state is involved.

Of course, this changes the total number of messages read out from the database and processed by means of the predefined algorithm and the corresponding relative frequencies. In an extended form this is appropriately taken into account.

As already explained above, a further extension of the invention consists in the fact that the method for monitoring infrastructure facilities of a route network is designed for rail vehicles. In an extension, the at least one predefined operating state relates to an unplanned lowering of a pantograph of the rail vehicles,
an unplanned shutdown of a power system of the rail vehicles,
a distribution of sand by the rail vehicles,
an oil lubrication of the rails by means of the rail vehicles,
a failed coupling operation of the rail vehicles,
door opening errors of the rail vehicles,
the violation of a specified jerk value of the rail vehicles,
rapid braking actions of the rail vehicles and/or
communication errors of the rail vehicles with a control center.

A unplanned lowering of a current collector, also known as a pantograph, is lowered by the train's self-protection system, for example if the pantograph receives an external impact, in particular from the overhead line as an infrastructure facility, or if the contact force is too low. An unplanned shutdown of a power system, in particular of locomotives, occurs for example, if the monitoring of the input voltage and input current into the locomotive shows an overvoltage or if the locomotive detects a short circuit or ground fault or if no stable voltage is supplied on a specific AC-current frequency band (50 Hz/100 Hz protection). A sand distribution on the track—also known as "sanding" of the rails—takes place, for example, if the track is contaminated with dirt at certain points, typically at level crossings, so that the respective rail vehicle, such as a locomotive, slips off the track (sliding skid protection). An oil-lubrication of the rails is carried out by means of the rail vehicles, for example, if the locomotive has too high a starting resistance. Failed coupling operations, for example, with other rail vehicles or with other parts of the same rail vehicle, in particular with other carriages or locomotives occur, for example, if the coupling has to be performed in a tight curve or due to a user error, for example, a sticking ignition key, which can occur at several places. Violations of a predefined jerk value, thus impacts due to high acceleration value outliers, occur for example, when goods wagons are moved together too violently during a coupling operation or due to poor-quality rail sections, such as uneven sections or warped rails. Also, rapid braking operations are typically caused by the train protection system, for example, in the event of a defective safety balise or due to external influences, such as a radar system nearby. Door opening faults occur, for example, due to uneven platform edges. Communication errors occur frequently when the radio connection to the train control station is interrupted (radio holes).

In an extension, the message about the respective operating state of the vehicle, which represents the occurrence of the signaled operating state, can also comprise one or more measurement values of at least one measurement variable or be formed by one or more measurement values of at least one measurement variable. In that case the vehicle comprises at least one measurement device for recording measurement values of at least one measurement variable. A message relating to a predefined operating state, in particular, for example, an error message, is only generated if at least one measurement value lies outside of a specified operating range.

Using the method, in addition to the limited areas it is also possible to detect a specific vehicle from the group of vehicles in which a predefined operating state frequently occurs:

identifying vehicles with frequent occurrence of the predefined operating state outside of the limited areas of the frequent occurrence of the predefined operating state by means of a predefined algorithm;
identifying the vehicles of the frequent occurrence of the predefined operating state outside of the limited areas of the frequent occurrence of the predefined operating state as a possible cause of the predefined operating state of the vehicles, and
outputting information about the vehicles that are identified as a possible cause of the predefined operating state of the vehicles.

This also rules out the possibility that the occurrence takes place on the infrastructure facilities identified as a possible cause of the predefined operating state of the vehicles.

The invention allows numerous embodiments. It will be explained on the basis of the following figures, each of which shows an exemplary embodiment. Identical elements in the figures are labelled with the same reference numerals.

BRIEF DESCRIPTION OF THE DRAWING

The single FIGURE of the drawing is an illustration of map having a plurality of infrastructure facilities of a route network.

DESCRIPTION OF THE INVENTION

The FIGURE shows a section of the screen (screenshot) with an excerpt of a map having a plurality of infrastructure facilities of a route network for rail vehicles, which is displayed on a screen of a land-based evaluation device. Multiple rail vehicles are travelling on this route network, in particular independently of each other, and generate messages relating to their respective operating states. These are assigned a time stamp and a location specification and are sent to the land-based evaluation device, received thereby, stored in a data base sorted in accordance with the signaled operating states and evaluated by means of a predefined algorithm in order to monitor the route network.

For this purpose, the messages relating to at least one predefined operating state, which were generated within a specified interval, are read out of the database. Messages relating to a plurality of operating states, which are assigned to a predefined category or a group of predefined operating states, for example having a certain similarity, are read out and further processed collectively. The messages are then grouped according to the locations of their occurrence and limited areas with frequent occurrence of the predefined operating state are determined and output by displaying them on the map.

Here, a plurality of circles on the map illustrate the limited areas with frequent occurrence of the predefined operating states. The operating states can be selected by the user from a list on the left-hand side. Here, an accidental lowering of a pantograph was defined as the operating state. Multiple operating states can also be selected. These are in turn represented by their colors. A first limited area with frequent occurrence of a first specified operating state is marked with a circle of a first color, while a second limited area with frequent occurrence of a second specified operating state is marked with a circle of a second color, wherein the first color is different from the second color.

The sizes of the circles can be used in a similar way to indicate the relative frequency of the messages relating to the predefined operating state in the limited area.

The user can select when a limited area should be imaged at all, thus the relative frequency of messages relating to the predefined operating state that must occur at the very least in the limited areas to be output in order to display them. Here, this value is 1% of the total number of stored and evaluated messages but can be increased up to 10%. In this case, here only messages of vehicles on non-identical journeys are taken into account. Here, at least two messages exist from vehicles on non-identical journeys in the limited area, so that the limited area is displayed. This specification must also be specified and, if appropriate, varied by the user.

The output here is provided to the operator of the infrastructure facility for planning maintenance.

Further outputs can be: the total number of messages, the number of messages in the respective identified area of frequent occurrence of the predefined operating state, the number of vehicles in the period under consideration in the respective identified area of the frequent occurrence of the predefined operating state, in particular those which have also generated at least one message relating to their respective (arbitrary) operating state in the area concerned, as well as the relative frequency of the messages relating to the at least one predefined operating state in the respective area with frequent occurrence of the predefined operating state relative to the total number of messages read out of the database relating to the at least one predefined operating state.

The invention claimed is:

1. A non-transitory computer readable medium having computer-executable instructions stored thereon for performing a method for monitoring infrastructure facilities of a route network for vehicles, the vehicles generating messages about their respective operating state, the messages being transmitted with an associated time and location specification that represent an occurrence of a signaled operating state, to a land-based evaluation device, the messages are received by the land-based evaluation device, stored in a database and evaluated, wherein the method performed by the computer executable-instructions, which are stored on the non-transitory computer readable medium, comprises the following method steps of:

reading out the messages of a predefined time period relating to at least one predefined operating state from the database;

determining limited areas with a frequent occurrence of the predefined operating state by means of a-predefined automatic segmentation algorithm by grouping location specifications, wherein a maximum distance between locations of the occurrence of the predefined operating state is defined in dependence on the predefined operating state;

identifying the infrastructure facilities in the limited areas having the frequent occurrence of the predefined operating state as a possible cause of the predefined operating state of the vehicles;

outputting, on a screen, information about the infrastructure facilities which are identified as the possible cause of the predefined operating state of the vehicles;

reading out at least one additional message which relates to the at least one predefined operating state from the database, the additional message is associated with a time that represents an occurrence of the signaled operating state, which follows a specified time period;

using the predefined algorithm to determine whether the at least one additional message should be assigned to a limited area having frequent occurrence of the predefined operating state, and if the at least one additional message should be assigned to the limited area with the frequent occurrence of the predefined operating state;

identifying the infrastructure facilities of the limited area having the frequent occurrence of the predefined operating state as the possible cause of the predefined operating state of the vehicles; and outputting, on the screen, at least one information item about the infrastructure facilities that are identified as the possible cause of the predefined operating state of the vehicles.

2. The non-transitory computer readable medium according to claim 1, wherein the method further comprises:

identifying the vehicles in areas with isolated occurrence of the predefined operating state as the possible cause of the predefined operating state of the vehicles; and outputting the information about the vehicles that are identified as the possible cause of the predefined operating state of the vehicles.

3. The non-transitory computer readable medium according to claim 1, wherein to determine the limited areas with the frequent occurrence of the predefined operating state by means of the predefined algorithm, the messages relating to the predefined operating state of vehicles on non-identical journeys are exclusively taken into account.

4. The non-transitory computer readable medium according to claim 1, wherein the limited areas with the frequent occurrence of the predefined operating state are determined by means of a density-based spatial clustering of applications with noise (DBSCAN) algorithm.

5. The non-transitory computer readable medium according to claim 1, wherein the method further comprises outputting information relating to:
  a total number of messages read out of the database relating to the at least one predefined operating state; and/or
  a respective number of messages relating to the at least one predefined operating state in the limited areas with the frequent occurrence of the predefined operating state; and/or
  a respective relative frequency of the messages relating to the at least one predefined operating state in the limited areas with the frequent occurrence of the predefined operating state relative to the total number of messages read out of the database relating to the at least one predefined operating state; and/or
  a respective number of the messages relating to the at least one predefined operating state of non-identical vehicles or of the vehicles on non-identical journeys in the limited areas with frequent occurrence of the predefined operating state; and/or
  a respective relative frequency of the messages relating to the at least one predefined operating state of the non-identical vehicles or of the vehicles on the non-identical journeys in the limited areas with the frequent occurrence of the predefined operating state relative to the total number of the messages read out of the database that relate to the at least one predefined operating state; and/or
  a respective extension of the limited areas with frequent occurrence of the predefined operating state; and/or
  a number of possible limited areas within the entire area of the messages relating to the predefined operating state; and/or
  the predefined algorithm for determining the limited areas with the frequent occurrence of the predefined operating state; and/or
  the predefined operating state.

6. The non-transitory computer readable medium according to claim 1, wherein a ranked list of the limited areas with the frequent occurrence of the predefined operating state is created and is output in dependence on:
  a respective number of the messages relating to the at least one predefined operating state;
  a respective extension of the limited areas with the frequent occurrence of the predefined operating state; and
  a respective relative frequency of the messages relating to the at least one predefined operating state in the limited areas with the frequent occurrence of the predefined operating state relative to a total number of the messages read out of the database relating to the at least one predefined operating state.

7. The non-transitory computer readable medium according to claim 1, wherein the method further comprises using the method for monitoring the infrastructure facilities of the route network for the rail vehicles, wherein the at least one predefined operating state relates to an unplanned lowering of a pantograph of the rail vehicles and/or wherein the at least one predefined operating state relates to an unplanned shutdown of a power system of the rail vehicles and/or wherein the at least one predefined operating state relates to a distribution of sand by the rail vehicles and/or wherein the at least one predefined operating state relates to an oil lubrication of the rails by the rail vehicle and/or wherein the at least one predefined operating state relates to a failed coupling operation of the rail vehicles and/or wherein the at least one predefined operating state relates to door faults of the rail vehicles and/or wherein the at least one predefined operating state relates to exceeding of a predefined jerk value of the rail vehicles and/or wherein the at least one predefined operating state relates to rapid braking operations of the rail vehicles and/or wherein the at least one predefined operating state relates to communication errors of the rail vehicles with a control center.

8. The non-transitory computer readable medium according to claim 1, wherein the limited areas with the frequent occurrence of the predefined operating state are determined by means of a k-means algorithm.

9. The non-transitory computer readable medium according to claim 8, wherein a number of possible limited areas within an entire area is defined as a function of the entire area and as a function of the predefined operating state.

10. The non-transitory computer readable medium according to claim 1, wherein a determination of the limited areas with the frequent occurrence of the predefined operating state by means of the predefined algorithm, or at least an output of the information about the infrastructure facilities identified as the possible cause of the predefined operating state of the vehicles, is carried out in dependence on a predefined relative frequency of the messages relating to the at least one predefined operating state in a specified possible limited areas with the frequent occurrence of the predefined operating state relative to a total number of the messages read out of the database relating to the at least one predefined operating state.

11. The non-transitory computer readable medium according to claim 10, wherein a number of possible limited areas with the frequent occurrence of the predefined operating state within an entire area of the messages relating to the predefined operating state and a fact that a relative frequency of the messages relating to the at least one predefined operating state in specified possible limited areas with the frequent occurrence of the predefined operating state relative to a total number of the messages read out of the database relating to the at least one predefined operating state are specified by a user.

* * * * *